United States Patent [19]

Uetsuki et al.

[11] Patent Number: 4,540,135
[45] Date of Patent: Sep. 10, 1985

[54] DEVICE FOR CONTROLLING A CLICK BRAKE ON A FLY REEL

[75] Inventors: Haruo Uetsuki; Takehiro Kobayashi, both of Hiroshima, Japan

[73] Assignee: Ryobi Ltd., Japan

[21] Appl. No.: 635,465

[22] Filed: Jul. 27, 1984

Related U.S. Application Data

[63] Continuation of Ser. No. 364,696, Apr. 2, 1982, abandoned.

[30] Foreign Application Priority Data

Apr. 6, 1981 [JP] Japan .............................. 56-49871[U]

[51] Int. Cl.³ .............................................. A01K 89/02
[52] U.S. Cl. .................................. 242/84.51 R; 74/578
[58] Field of Search .................. 242/84.51 R, 84.5 R, 242/578; 74/577 R, 575; 116/307; 188/74

[56] References Cited

U.S. PATENT DOCUMENTS

| 853,311 | 5/1907 | Marhoff | 242/84.51 R |
| 2,340,892 | 2/1944 | Maynes | 252/84.51 R |

FOREIGN PATENT DOCUMENTS 355494 8/1931 United Kingdom ......... 242/84.51 R

Primary Examiner—Billy S. Taylor
Attorney, Agent, or Firm—Sughrue, Mion, Zinn, Macpeak, and Seas

[57] ABSTRACT

A click brake for a fly reel includes an adjustment mechanism whereby line may be released either soundlessly or with an accompanying clicking noise. In the soundless condition no braking force is applied, but in the clicking condition, the braking force may be steplessly increased by increasing the pressure on a pawl engaged with the click gear. The pressure on the pawl is applied via a spring which is adjustably tensioned by a cam and control lever arrangement.

10 Claims, 6 Drawing Figures

DEVICE FOR CONTROLLING A CLICK BRAKE ON A FLY REEL

This application is a continuation of application Ser. No. 364,696 filed Apr. 2, 1982 now abandoned.

BACKGROUND OF THE INVENTION

This invention relates to a device for controlling a click brake in a fly reel, and more particularly to a device in which a single control lever can effect both the control of the braking force of the click brake, and the release of the brake.

A fly reel is usually provided with a click brake for releasing a fishing line in either a soundless manner or in a manner in which a sound is produced.

FIGS. 1 and 2 show a known click brake, by way of example. A substantially L-shaped pawl holder b is pivotably supported on a real body g by a pivot shaft c, and has one end b' upon which a pawl a is rotatably supported. A control cam d is rotatably supported on the reel body g, and associated with the other end b" of the holder b to cause the pawl holder b to engage the pawl a with a click gear e operationally associated with a spool, or to disengage the pawl a from the click gear e. A pawl spring f is provided for biasing the pawl a toward the click gear e to apply a braking force. Although this click brake can be switched over between two positions for respectively releasing the fishing line in a soundless manner or in a manner producing a sound, its braking force is not adjustable.

SUMMARY OF THE INVENTION

It is, therefore, an object of this invention to provide a device for controlling a click brake to enable the release of a fishing line in two modes, i.e., in a soundless mode, and in a sound producing mode in which the braking force is adjustable as desired, thereby creating improved release control. The device includes a first cam for controlling a pawl, a second cam for controlling a pawl spring, and a common control lever shaft on which the first and second cams are supported for coaxial rotation. The pawl spring is rotatable about a pivot shaft for a pawl holder, and has one end bearing resiliently on the pawl, while the other end thereof bears resiliently on the second cam.

The first cam is formed so as to cause the pawl to engage a click gear during the first mode of operation, while the pawl is disengaged from the click gear during the second mode. The second cam is profiled so as to displace the pawl spring within the first mode to adjust the spring force on the pawl to thereby adjust the braking force as desired.

DETAILED DESCRIPTION OF THE PREFERRED EMBODIMENTS

Figure 1:
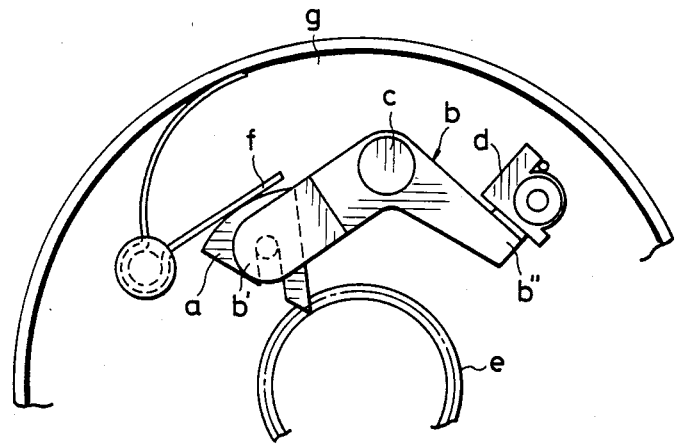
FIG. 1 is a front elevational view of a known click brake device for a fly reel, in its sound producing position.
Figure 2:
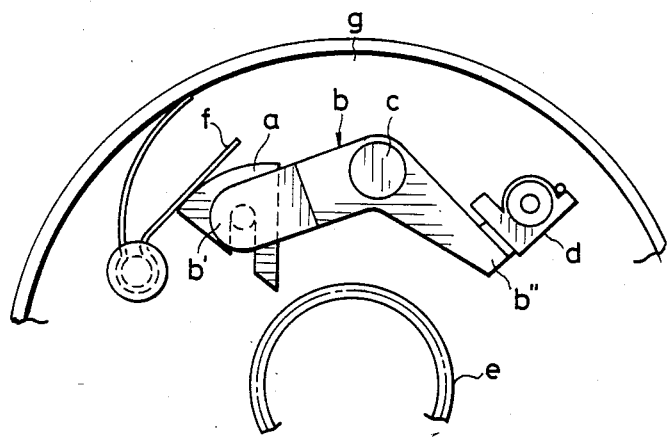
FIG. 2 is a view similar to FIG. 1, but showing the device in its soundless position.
Figure 3:
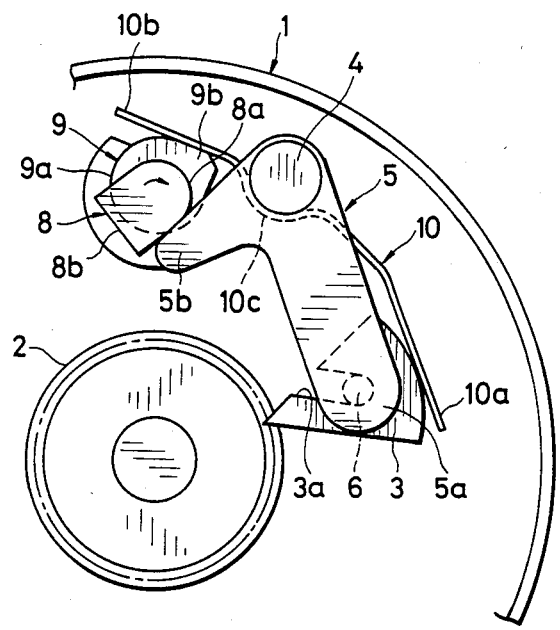
FIG. 3 is a front elevational view of a fly reel click brake control device embodying this invention, showing the device in a sound producing position in which a strong braking force prevails.
Figure 4:
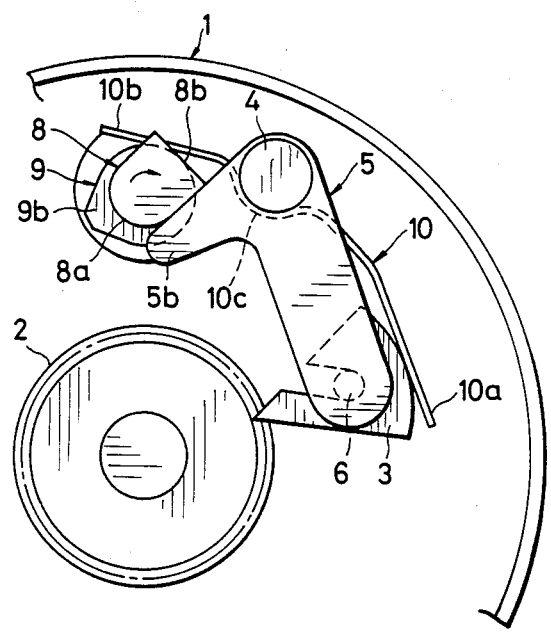
FIG. 4 is a view similar to FIG. 3, but showing the device in a sound producing position in which a weak braking force prevails.

The invention will now be described more specifically by way of example with reference to the drawings. Referring to FIGS. 3 to 6, a click gear 2 is secured to a reel body 1 coaxially with a spool (not shown) supported thereon rotatably by a handle (not shown), and is operationally associated with the spool. A pawl 3, which is engageable with, and disengageable from the click gear 2, is supported by a rivet 6 on one end 5a of a substantially L-shaped pawl holder 5, a substantially middle portion of which is supported pivotably on the reel body 1 by a pivot shaft 4 such as a spring rivet. A first cam 8 is operationally associated with the other end 5b of the pawl holder 5 to rotate the same, and is mounted on a control lever shaft 7 supported rotatably on the reel body 1. A second cam 9 for pawl spring control is secured to the control lever shaft 7 for rotation coaxially with the first cam 8. A pawl spring 10 has a substantially middle portion supported on the pivot shaft 4, and a pair of ends 10a and 10b bearing resiliently on the pawl 3 and the second cam 9, respectively. The first cam 8 has a cam surface 8a having a small distance from the axis thereof, and which is adapted to cause the pawl holder 5 to engage the pawl 3 with the click gear 2 during the first mode of operation as shown in FIGS. 3 and 4, and a cam surface 8b having a large distance from the axis thereof, which is adapted to cause the pawl holder 5 to disengage the pawl 3 from the click gear 2 during the second mode shown in FIG. 5.

The second cam 9 has a cam surfaces 9a and 9b contacting the other end 10b of the pawl spring 10 when the device is in its first mode of operation. The distance between the peripheral surface of the cam 9 and its axis of rotation gradually decreases from the projection 9b to the cam surface 9a, so that the braking force applied by the pawl spring 10 may gradually decrease with the gradual displacement of the other end 10b thereof during the operation of the device in its first mode. The projection 9b is diametrically opposite the cam surface 8b of the first cam 8. The pawl spring 10 comprises a leaf spring. Its substantially middle portion includes a generally semicircularly curved portion 10c fitted about the pivot shaft 4 for the pawl holder 5 so that the spring 10 may not be separated from the shaft 4. The pawl 3 has a slot 3a in which the rivet 6 is displaced so that the pawl 3 may be rotatable about the rivet 6, and displacable relative thereto.

During the first mode of operation as shown in FIG. 3, the cam surface 8a of the first cam 8 is in contact with the other end 5b of the pawl holder 5, and therefore, the pawl spring 10 maintains the pawl 3 in engagement with the click gear 2. If the fishing line is released, the click gear 2 is rotated with the spool, and the engagement of the pawl 3 with the teeth on the click gear 2 and the continual rotation which the click gear 2 effects in overcoming the spring force produces a clicking sound. Since during this mode of operation, the other end 10b of the pawl spring 10 is urged away from the axis of the second cam 9 by its projection 9b, the spring 10 applies a strong force onto the pawl 3, and hence, a strong braking force on the click gear 2, resulting in a greater resistance to the rotation of the spool.

If the control lever shaft 7 is rotated clockwise in FIG. 3, the device is adjustable within the first mode. Since the pawl holder 5 contacts the cam surface 8a, the pawl 3 remains in engagement with the click gear 2, but as the second cam 9 is also rotated, the other end 10b of the pawl spring is displaced toward the axis of the second cam 9 with the rotation thereof, so that the spring force acting on the pawl 3 gradually becomes smaller than described above. Accordingly, there results a gradual reduction in the braking force, the clicking sound, and the resistance to spool rotation.

Figure 5:
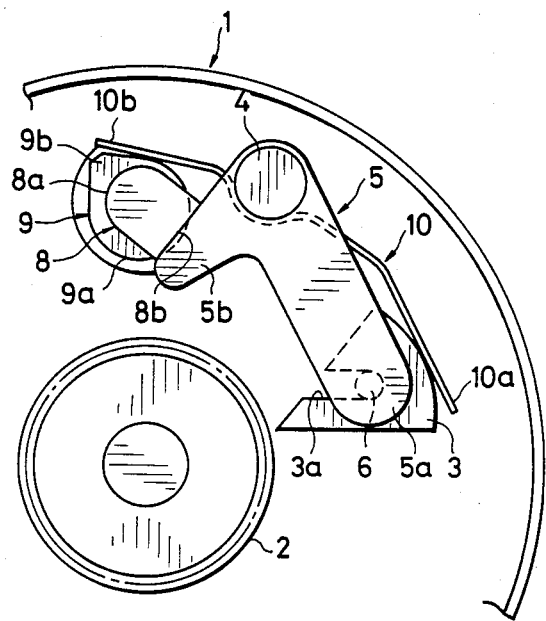
FIG. 5 is a view similar to FIG. 4, but showing the device in its soundless position, in which no braking force prevails.
Figure 6:
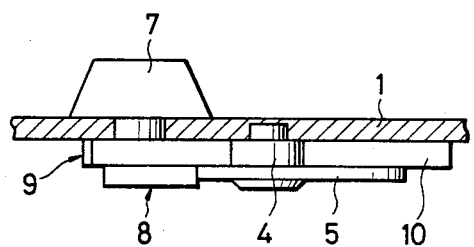
FIG. 6 is a fragmentary cross sectional view of the device shown in FIGS. 3 to 5.

If the control lever shaft 7 is rotated by 90° clockwise in FIG. 4, the cam surface 8b of the first cam 8 causes the pawl holder 5 to rotate counterclockwise to disengage the pawl 3 from the click gear 2, as shown in FIG. 5. The spool is relieved from the braking force, and rotates in a soundless, unbraked condition for releasing the fishing line. A strong spring force acts on the pawl 3, but does not create any braking force, since the pawl 3 is kept away from the click gear 2.

Although the conventional device permits the rotation of the second either in a sound producing condition (with the braking force acting on the spool), or in a soundless condition by rotating a lever to engage the pawl with the click gear, or disengage the pawl from the click gear, the click brake control device of this invention enables adjustment of the braking force in a stepless fashion as desired by varying the force of the pawl spring 10, as the second cam 9 which is rotatable coaxially with the first cam 8 displaces the pawl spring 10 in a stepless fashion. Meanwhile, the first cam 8, which engages the pawl 3 with, or disengages it from the click gear 2, maintains the pawl 3 in engagement with the click gear 2 throughout the operation just described. Therefore, the device permits the fishing line to be released in an unbraked condition in which no sound is produced, or in a braked and sound producing condition in which the sound and the braking force are both adjustable in a stepless fashion, in accordance with the fishing conditions or the fishing method or preference.

The switchover of the device between modes of operation can be effected easily and quickly. The device is simple in construction, since the pawl spring 10 is supported about the pivot shaft 4 for the pawl holder with its opposite ends bearing resiliently on the pawl 3 and the second cam 9. The force which the single pawl spring 10 exerts on the pawl 3 can be effectively varied between the strong and weak levels, as desired.

What is claimed is:

1. A click brake control device for a fly reel having a spool and an associated click gear, said control device comprising:
   a pawl;
   a pawl holder slidably supporting said pawl at one end of said pawl holder and including a cam-engaging surface at the other end of said pawl holder, said pawl holder being pivotably supported at a position intermediate said one and other ends thereof;
   a spring for biasing said pawl toward said click gear and including a cam-engaging surface at one end thereof; and
   a cam assembly including a first cam member for moving said pawl into and out of engagement with said click gear, said first cam member being rotatable about a common axis and disposed between said cam-engaging surfaces of said pawl holder and spring, said first cam member urging said cam-engaging surface of said pawl away from said common axis in order to move said pawl out of engagement with said click gear, and a second cam member for varying the force exerted by said spring on said pawl when said pawl engages said click gear to thereby vary the braking force on said spool, said second cam member being disposed between said cam-engaging surfaces of said spring and pawl holder and in a different plane from said first cam member, said second cam member being rotatable in said different plane about said common axis to urge said cam-engaging surface of said spring away from said common axis in order to increase the force exerted by said spring on said pawl.

2. A click brake control device as claimed in claim 1, wherein said spring is engaged at the other end thereof with said pawl, said second cam member having a changing radius, the largest radius of said second cam member being smaller than a radius of said click gear.

3. A click brake control device as claimed in claim 1, wherein said spring is engaged at the other end thereof with said pawl, and wherein said pawl holder is pivotably disposed on a pivot pin, and said spring includes a middle portion bearing on said pivot pin.

4. A click brake control device as claimed is claim 3, said first and second cam members disposed on a common control lever shaft.

5. A click brake control device as claimed in claim 3, wherein said first cam member is movable between a plurality of first positions in which said pawl is permitted to engage said click gear as said second cam varies said spring force, and is movable to at least a second position wherein said pawl holder is rotated to disengage said pawl from said click gear.

6. A click brake control device as claimed in claim 5, wherein said first cam in said second position rotates said pawl holder against the force of said spring, said first cam having a camming surface shaped such that said spring exerts substantially no rotational force on said first cam when said first cam is in said second position.

7. A click brake control device as claimed in claim 6, wherein said first cam has a flat surface engaging said pawl holder in said first position of said first cam.

8. A click brake control device is claimed in claim 7, wherein said flat surface is perpendicular to a radius extending from said common axis.

9. A click brake control device as claimed in claim 1, wherein said pawl holder includes a pin, said pawl including a slot therein having an open end directed generally toward said click gear for receiving said pin, and said spring urging said pawl toward said click gear to hold said pin in said slot.

10. A click brake control device as claimed in claim 2, wherein said pawl is slidably mounted with respect to said pawl holder and said spring urges said pawl for movement with respect to said pawl holder toward said click gear.

* * * * *